(12) United States Patent
Agrawal et al.

(10) Patent No.: US 9,325,542 B2
(45) Date of Patent: Apr. 26, 2016

(54) POWER-SCALABLE SKEW COMPENSATION IN SOURCE-SYNCHRONOUS PARALLEL INTERFACES

(71) Applicant: GLOBALFOUNDRIES Inc., Grand Cayman (KY)

(72) Inventors: Ankur Agrawal, Yorktown Heights, NY (US); Timothy O. Dickson, Yorktown Heights, NY (US); Sergey Rylov, Yorktown Heights, NY (US)

(73) Assignee: GlobalFoundries Inc., Grand Cayman (KY)

( * ) Notice: Subject to any disclaimer, the term of this patent is extended or adjusted under 35 U.S.C. 154(b) by 483 days.

(21) Appl. No.: 13/683,508

(22) Filed: Nov. 21, 2012

(65) Prior Publication Data

US 2014/0140439 A1   May 22, 2014

(51) Int. Cl.
   *G06F 1/00*   (2006.01)
   *H04L 25/14*  (2006.01)
   *G06F 1/10*   (2006.01)
   *H04L 7/00*   (2006.01)

(52) U.S. Cl.
   CPC *H04L 25/14* (2013.01); *G06F 1/10* (2013.01); *H04L 7/0008* (2013.01); *H04L 7/0025* (2013.01)

(58) Field of Classification Search
   CPC .......................................................... G06F 1/10
   USPC ........... 713/500, 503, 300; 341/155; 327/158, 327/157; 375/130
   See application file for complete search history.

(56) References Cited

U.S. PATENT DOCUMENTS

| | | | | |
|---|---|---|---|---|
| 8,446,196 | B2* | 5/2013 | Watanabe | G11C 7/1087 327/158 |
| 2003/0179028 | A1* | 9/2003 | Kizer | G06F 1/10 327/158 |
| 2004/0125008 | A1* | 7/2004 | Yamaji | 341/155 |
| 2005/0024107 | A1* | 2/2005 | Takai et al. | 327/158 |
| 2006/0044032 | A1* | 3/2006 | Gomm | G11C 7/1066 327/157 |
| 2007/0033427 | A1* | 2/2007 | Correale et al. | 713/500 |
| 2007/0050658 | A1* | 3/2007 | Kuwata | 713/503 |
| 2007/0189360 | A1* | 8/2007 | Mobin | H04B 1/7075 375/130 |
| 2011/0060926 | A1* | 3/2011 | Brooks et al. | 713/300 |
| 2012/0187991 | A1* | 7/2012 | Sathe et al. | 327/158 |

* cited by examiner

*Primary Examiner* — Thomas Lee
*Assistant Examiner* — Aurel Prifti
(74) *Attorney, Agent, or Firm* — DeLio, Peterson & Curcio, LLC; Peter W. Peterson

(57) ABSTRACT

A parallel receiver interface includes a plurality of parallel data receivers, each receiver receiving input data. A clock receiver is configured to receive a forwarded clock. A phase interpolator has an input coupled to the output of the clock receiver and has an output coupled to each of the parallel receivers. Parallel clock delay elements are within each of the parallel data receivers, each clock delay element configured to provide varying amounts of clock phase adjustment. Inputs of a multiplexer circuit within each of the parallel data receivers are coupled to the outputs of each of the parallel clock delay elements within a respective parallel data receiver. An output of the multiplexer circuit is coupled to a data sampler within the respective parallel data receiver, the multiplexer circuit being configured to be controlled by a logic signal.

15 Claims, 10 Drawing Sheets

POWER-SCALABLE SKEW COMPENSATION IN SOURCE-SYNCHRONOUS PARALLEL INTERFACES

STATEMENT REGARDING FEDERALLY SPONSORED RESEARCH OR DEVELOPMENT

This invention was made with Government support under Contract No.: H98230-07-C-0409 (awarded by National Security Agency) (NSA)). The Government has certain rights in this invention.

BACKGROUND

1. Technical Field

The present disclosure relates to timing recovery methods for source-synchronous parallel data interfaces and, more particularly, to a technique for implementing multiple skew compensation methods in a single parallel interface.

2. Discussion of Related Art

Input/output (I/O) subsystems play a critical role in computing systems such as servers. Bandwidth requirements in such systems continue to grow, fueled by the increase in computation capabilities resulting from complementary metal-oxide-semiconductor (CMOS) scaling and multi-core processor architectures. At the same time, power requirements in these systems demand improvements in power efficiencies for I/O subsystems. Low-power I/O architectures become increasingly challenging as data rates exceed several gigabits per second (Gb/s) due to several factors. First, compensation of channel impairments at high frequencies raises a need for equalization capabilities in serial transceivers. Second, timing budgets become increasingly constrained as the bit unit interval (UI) decreases. Accurate receiver sampling dictates the need for sampling clock phase adjustment with resolution on the picosecond (ps) time scale. This is especially critical in equalizing receivers, where the voltage sampling margins can degrade rapidly as the sampling clock phase deviates from an optimal position within the UI. Circuits such as phase interpolators (sometimes called phase rotators) are commonly introduced into serial receiver architectures in order to perform sampling phase adjustment. These circuits are capable of providing 360° phase adjustment with picosecond time scale resolution. Often, phase rotators need additional circuitry to condition the clock input into the phase rotator. For example, slew-rate limited quadrature clocks are required for high-linearity current-mode logic (CML) phase rotator architectures. Adding a phase rotator and any associated conditioning circuitry into a serial receiver can contribute substantially to the receiver power need. In certain power-constrained applications, it is desirable to avoid this extra power need.

Parallel source-synchronous I/O architectures employing bus-level timing recovery are becoming more common. In this type of scheme, the phase of a global sampling clock is determined at a bus-level based upon timing information obtained from multiple data samplers. This approach is attractive in ultra-low-power I/O subsystems, since the power of the global phase adjustment circuitry can be amortized across the width of the interface, thereby resulting in improved link power efficiency. One parallel interface is restricted to operating over channels where little-to-no lane-to-lane skew exists, and a true global sampling clock phase can be employed. In contrast, another parallel interface adds a fractional-UI clock deskew per data sampler such that small lane-to-lane (perhaps ¼ to ⅓ of a UI) can be compensated. This static skew could arise from effects such as differences in the transmission line lengths over which data is transmitted, mismatches in delays through active circuits in the transmitter or receiver, or skew in the clock distribution within the physical layer (PHY) of the basic networking hardware transmission technology of a network. Assuming the per-lane element to achieve the fractional-UI deskew (or delay) involves lower power than a full 360° phase rotator, the scheme which adds a fractional-UI clock deskew per data sampler would involve lower power and lower area than more conventional per-lane edge sampling.

The two approaches described above both rely on relatively low lane-to-lane skew across a parallel interface. This can be the case in well-controlled environments, such as data communication over dense interconnects on a silicon interposer or ceramic or laminate multi-chip module (MCM). However, these PHY architectures would need to be modified to handle higher-skew conditions, such as cases where data needs to be sent over chip-to-chip links on a printed circuit board (PCB). The lane-to-lane skew in some chip-to-chip applications can be several UI, rendering a fractional-UI delay line useless for skew compensation. However, since the power consumption of deskew elements tends to rise with the range of controllable delay they can introduce, it is undesirable to include more skew compensation than is needed for a particular application.

Therefore, to reduce PHY development costs, a need exists to have a single PHY with power-scalable deskew capabilities that can be employed in multiple use scenarios ranging from no lane-to-lane skew (such as links on an MCM) to high lane-to-lane skew (such as communication over several inches on a PCB).

BRIEF SUMMARY

Exemplary embodiments of the present disclosure provide multiple parallel skew compensation paths, each with a different total delay range for skew compensation, within each bit receiver in a parallel receiver interface. One of the parallel skew compensation paths can be enabled at a given time while the remaining paths are powered down. These can be used in conjunction with a global phase adjustment mechanism (such as a 360° phase rotator) to enable accurate sampling clock-to-data alignment for a parallel interface. Alternatively, in another embodiment the global phase rotator can be bypassed and a per-lane phase rotator can be enabled.

In accordance with an exemplary embodiment a parallel receiver interface includes a plurality of parallel data receivers, each parallel data receiver being configured to receive input data, a clock receiver configured to receive a forwarded clock, a phase interpolator, the input of which is coupled to the output of the clock receiver, and the output of which is coupled to each of the parallel receivers, parallel clock delay elements within each of the parallel data receivers, each clock delay element configured to provide varying amounts of clock phase adjustment, a multiplexer circuit within each of the parallel data receivers, inputs of the multiplexer circuit being coupled to the outputs of each of the parallel clock delay elements within a respective parallel data receiver, and an output of the multiplexer circuit being coupled to a data sampler within the respective parallel data receiver, the multiplexer circuit being configured to be controlled by a logic signal.

The parallel receiver interface may include bypass path provided for the phase interpolator.

Parallel clock delay elements not selected by the multiplexer may operate in a reduced power state.

One of the parallel clock delay elements within each parallel data receiver may be programmable.

One of the parallel clock delay elements within each parallel data receiver may not be programmable.

One of the parallel clock delay elements within each parallel data receiver may be configured to provide 360° of clock phase adjustment.

Multiple clock phases may be provided to the clock receiver when selectively enabling at least one clock delay path.

In accordance with an exemplary embodiment, a method for skew compensation for source-synchronous parallel interface receiver circuitry includes providing a plurality of independent parallel delay paths for each receiver, wherein each delay path has a different total delay range for skew compensation, selectively enabling at least one desired delay path.

The method for skew compensation can further include bypassing and/or powering down at least one non-desired delay path to reduce power consumption.

Providing a plurality of independent delay paths may include providing a delay element having no phase adjustment capabilities, a delay element having phase adjustment capabilities for providing fractional unit interval deskew, and/or a delay element providing 360° phase adjustment capabilities.

The selectively enabling may be conducted based upon operating environment.

The operating environment may be a need for deskew.

The operating environment may be a need for phase adjustment.

The bypassing and/or powering down may be done by asserting a control signal.

In accordance with an exemplary embodiment a source-synchronous parallel interface includes a plurality of multiple parallel delay elements, and at least one controller for selectively enabling at least one of the delay elements/paths.

The multiple parallel delay elements may include a delay element having no phase adjustment capabilities, a delay element having phase adjustment capabilities for providing fractional unit interval deskew, and/or a delay element providing 360° phase adjustment capabilities.

BRIEF DESCRIPTION OF THE SEVERAL VIEWS OF THE DRAWINGS

Exemplary embodiments will be more clearly understood from the following detailed description taken in conjunction with the accompanying drawings in which.

DETAILED DESCRIPTION

Figure 1:
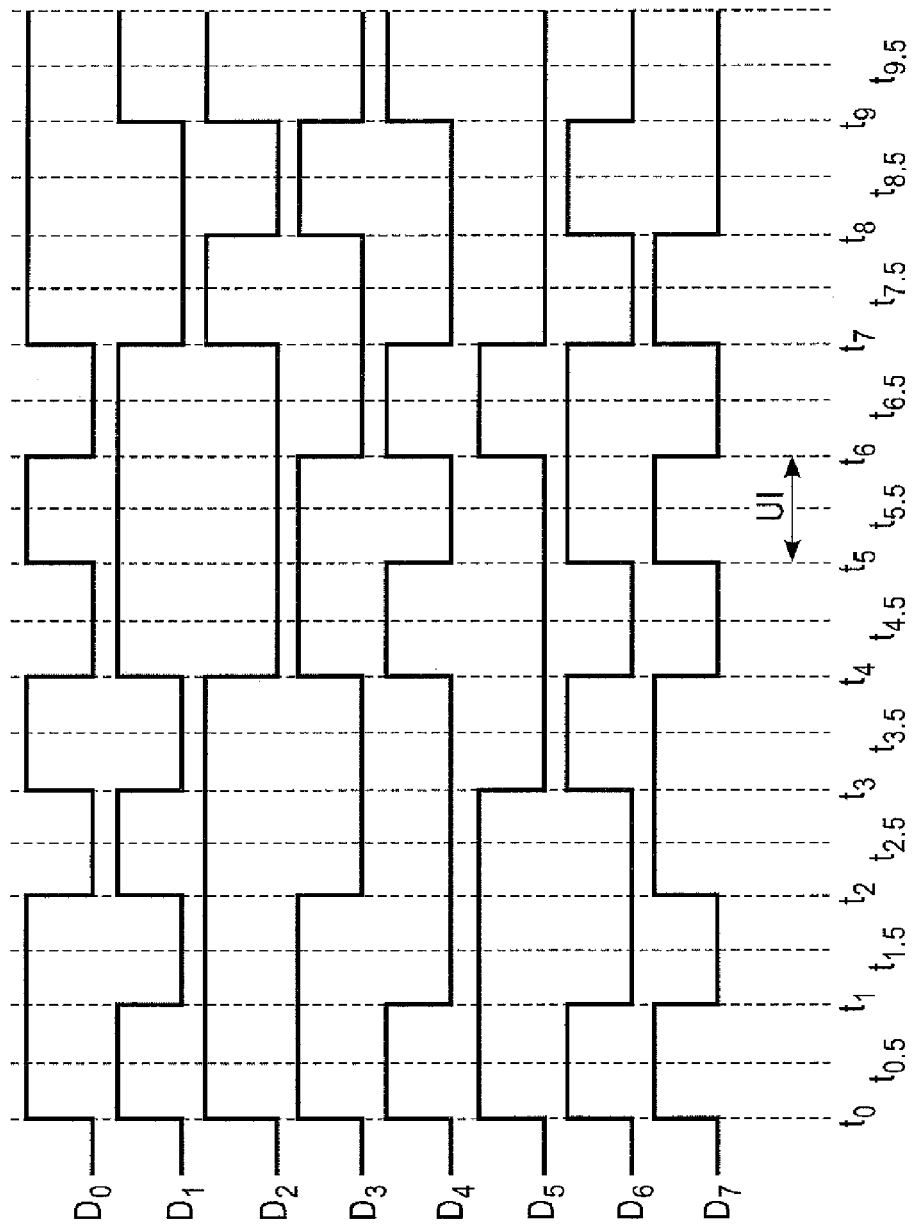
FIG. 1 depicts 8-bit wide parallel data (i.e., "bus" data) with no skew, to be received by a parallel receiver interface.

Reference will now be made in more detail to the exemplary embodiments which are illustrated in the accompanying drawings, wherein like reference numerals refer to the like elements throughout.

Referring now to FIG. 1, 8-wide parallel bus data to be received by a parallel receiver interface is depicted. While binary data (also known as non-return to zero (NRZ) data) is shown in the figure, those skilled in the art would appreciate that although it is understood that exemplary embodiments of the present disclosure could be applied to receivers recovering serial data with different modulation schemes (e.g., pulse-amplitude modulation (PAM-4)). To simplify the illustration, all 8 data inputs $D_0, D_1, \ldots D_7$ transition from binary values zero to one at time $t_0$. Since the edges of all parallel data bits are aligned at time $t_0$, this figure illustrates a scenario where no skew exists between any of the bits in the bus. (Without loss of generality, different definitions of skew could be invoked, such as alignment of the center of the data bits as opposed to alignment of the edges of the data bits, as would be understood by those skilled in the art). In FIG. 1, data transitions occur at integer time intervals (i.e., $t_0, t_1, t_2$, etc.). The difference between these integer time intervals (i.e., $t_1-t_0$) is a UI. It is assumed that the data will be sampled by a parallel receiver interface (or a receive bus) clocked with a sampling clock. For the waveforms illustrated in FIG. 1, the optimal sampling clock phase for any bit in the bus lies half-way between the integer time intervals. Therefore, half-integer time intervals (i.e., $t_{0.5}, t_{1.5}, t_{2.5}$, etc.) are also highlighted to show the optimal sampling phase position for the sampling clock. Since no skew exists across the bus, a single clock phase is sufficient to sample all of the bits in the bus. The receive bus can include circuitry to adjust a single clock phase (known as a global sampling clock phase) for optimal sampling of all bits in the bus.

Figure 2:
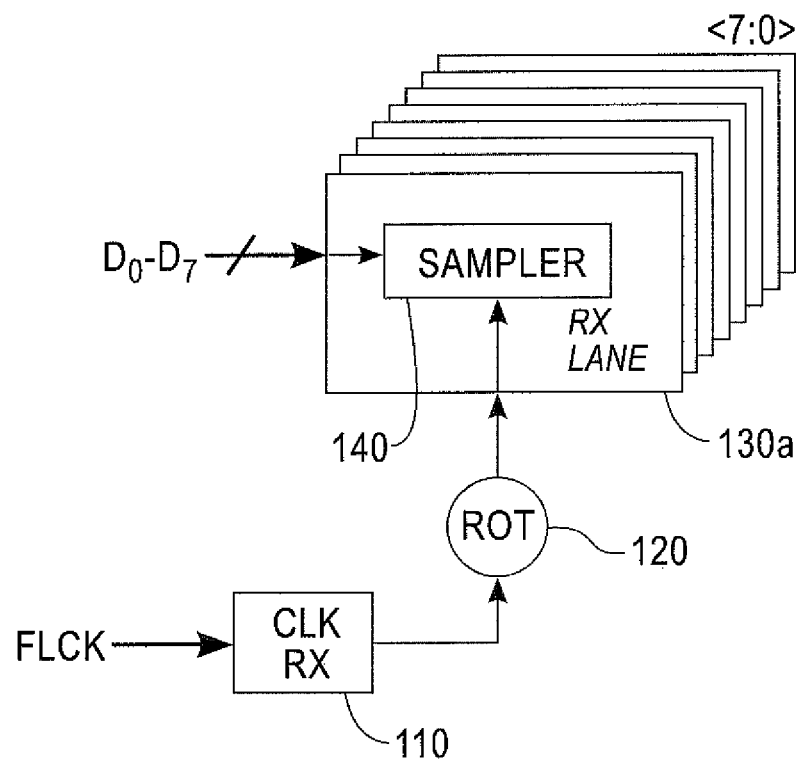
FIG. 2 depicts a conventional parallel receiver interface configured to sample or capture data bits $D_0$ through $D_7$ of FIG. 1.

FIG. 2 depicts a conventional parallel receiver interface configured to sample or capture data bits $D_0$ through $D_7$ of FIG. 1. In a source-synchronous architecture, the transmitter also forwards clock signal FCLK to be captured by the receive bus. Clock signal FCLK is received by clock receiver circuit (CLK RX) 110 in FIG. 2. CLK RX 110 could be as simple as a buffer circuit or amplifier. More complex clock receivers may involve the use of one or more phase-locked loops (PLL). CLK RX 110 then sends the clock signal to phase rotator (ROT) 120 which adjusts the phase of the sampling clock to be distributed to each of eight receive lanes (RX LANE) 130*a*. RX LANE 130*a* includes sampler circuit 140 (e.g., a latch) used to capture the data. Other embodiments of RX LANE 130*a* could include additional circuitry including but not limited to equalizer, deserializers, first-in-first-out (FIFO) structures, and so forth. Moreover, it is understood that sampler 140 in the RX LANE 130*a* could involve multiple samplers operating in a time-interleaved fashion, as would be appreciated by those skilled in the art. A key observation in this receive bus architecture is that a single sampling clock phase (the global sampling clock) is used for all eight samplers in the receive bus. No circuitry exists to permit sampling clock phase adjustment on a per-lane basis.

Figure 3:
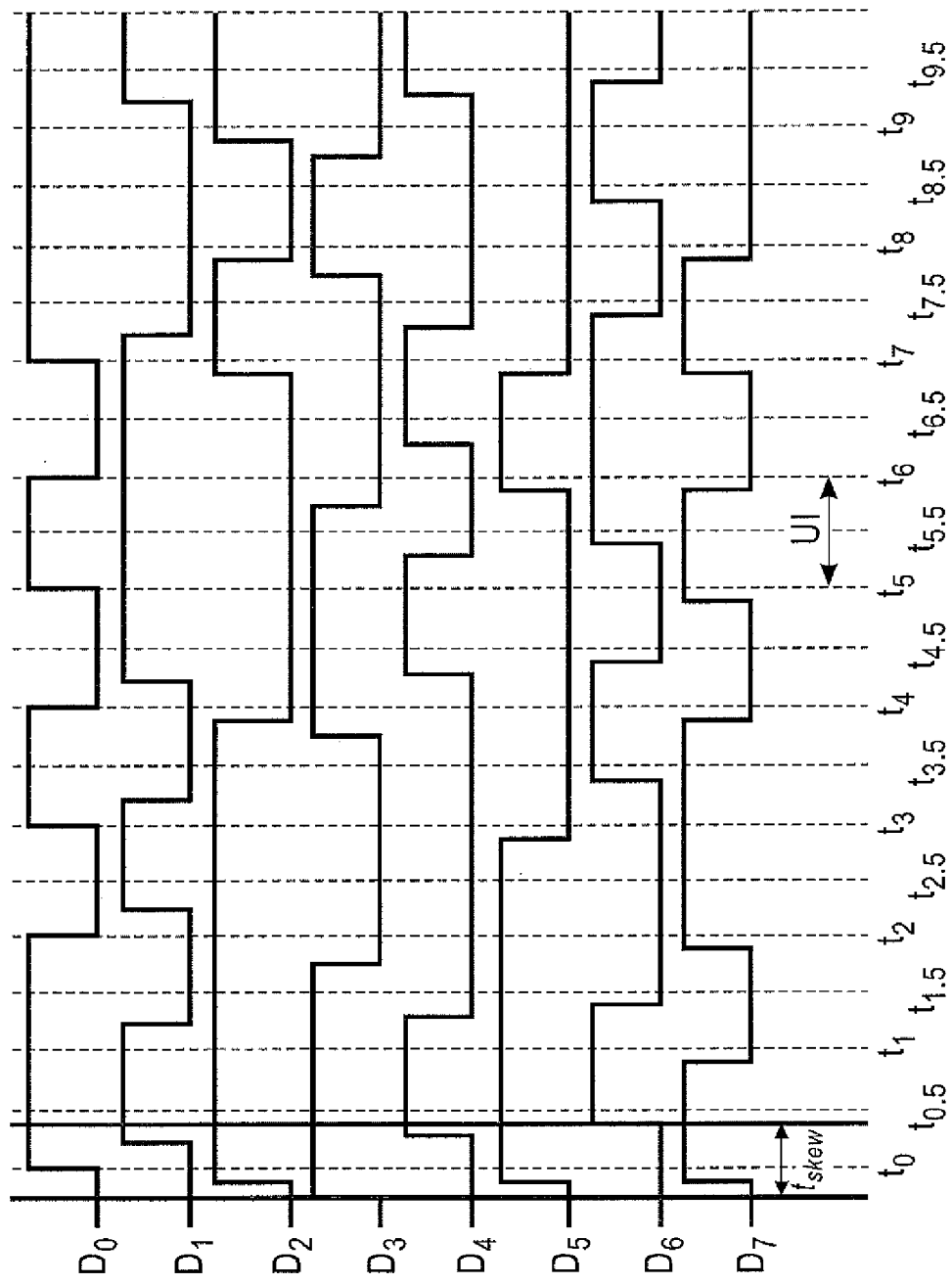
FIG. 3 depicts 8-bit wide parallel bus data with total skew less than one UI.

In contrast to the previous example, FIG. 3 illustrates bus data where skew exists between the bits across the bus. For the purpose of illustration, the data sequences are the same for both FIGS. 1 and 3, and the first rising edge of data bit $D_0$ occurs at time $t_0$ in both figures. The sampling clock positions at the half-integer times intervals represent the ideal sampling position for data bit $D_0$. However, as is seen in the figure, the first rising edge of $D_1$ occurs slightly later than that of $D_0$. Furthermore, the first rising edge of $D_2$ occurs slightly earlier than that of $D_0$. In this illustration, one definition of the skew could be the difference between the earliest and latest rising edges across the bus. This is highlighted as time $t_{skew}$ in FIG. 3, representing the time between the rising edge of $D_3$ (the earliest bit in the bus) and the rising edge of $D_6$ (the latest bit in the bus). Several effects could create this skew. If the bits are sent over traces on a PCB, mismatches in the traces lengths used to send the bits from the transmitter to the receiver would result in different time-of-flights for each of the bits. As would be understood by those skilled in the art, static skew in the clock distribution (as opposed to skew in the data bits) in a receive bus integrated circuit would effectively result in the same problem illustrated in FIG. 3. In any event, the result is a degradation of the sampling timing margins. While the sampling clock phase at time $t_{0.5}$ is optimal for sampling data bit $D_0$, it is clear that this sampling clock phase is sub-optimal for sampling data bit $D_6$ since the rising edge of that data bit is closer to the sampling clock position. This could result in sampling errors, perhaps due to setup time violations in a sampling latch used to capture the data.

Figure 4:
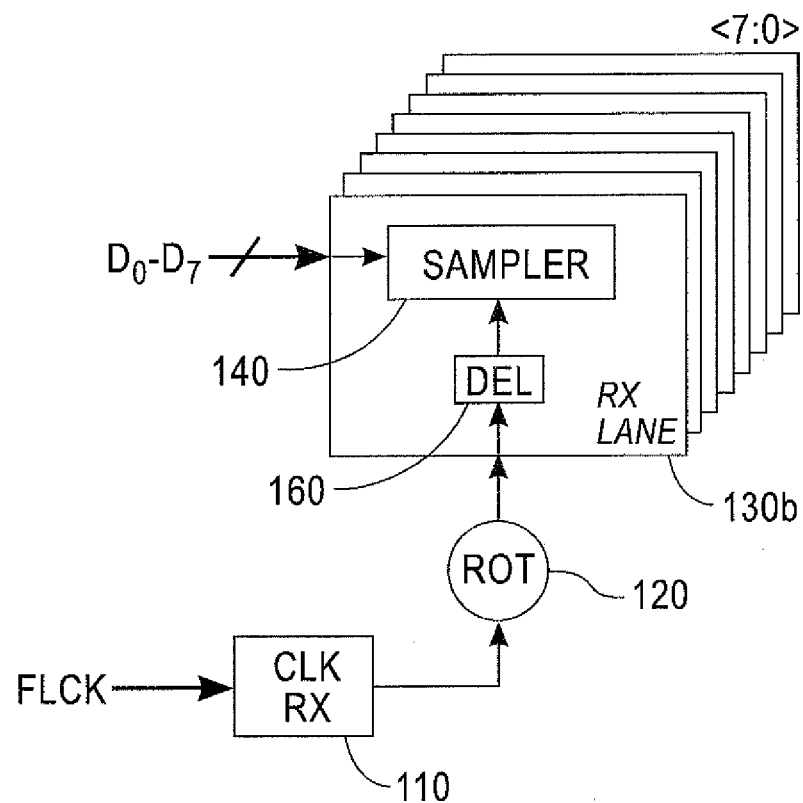
FIG. 4 depicts a conventional parallel receiver interface configured to sample or capture data bits $D_0$ through $D_7$ of FIG. 3.

Use of the receive bus architecture of FIG. 2 to capture the data sequences in FIG. 3 would result in poor timing margins, particularly with bit $D_6$ as described above. An alternative conventional embodiment involves the use of a per-lane sampling phase adjustment, as depicted in FIG. 4. Here, programmable delay element (DEL) 160 is inserted in the clock path within each RX LANE 130b to permit adjustment of the sampling clock phase for each of the eight samplers in the receive bus. For the amount of skew illustrated in FIG. 3, this delay element would only require adjustments of the sampling clock position by a fraction of a UI. However, it is expected that the additional circuitry in the receive bus of FIG. 4 will result in higher total power consumption as compared to the receive bus of FIG. 2. Note that the receiver architecture of FIG. 4 can also be used to capture the bus data without skew as depicted in FIG. 1.

Figure 5:
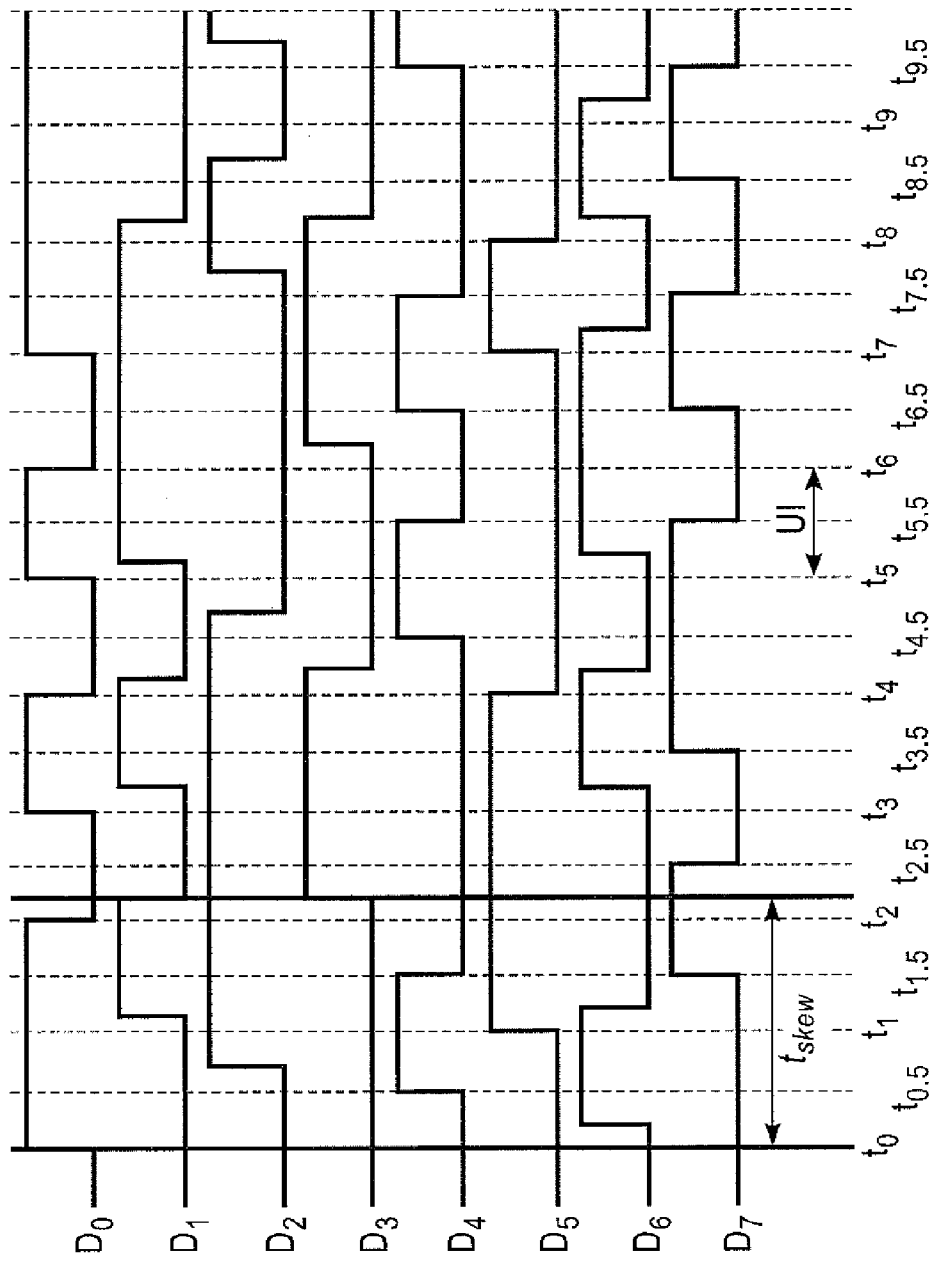
FIG. 5 depicts 8-bit wide parallel bus data with total skew bus being greater than one UI.
Figure 6:
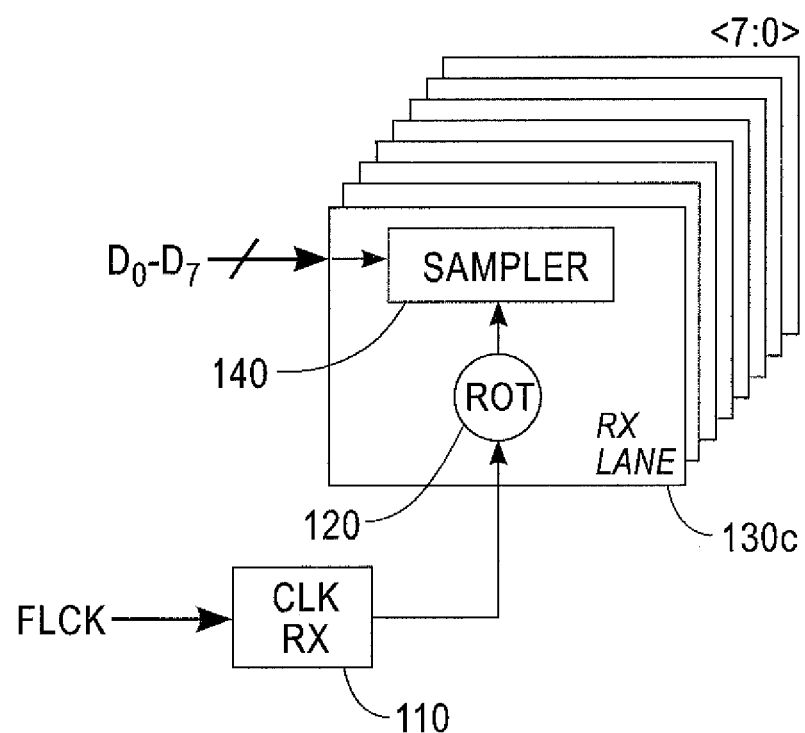
FIG. 6 depicts a conventional parallel receiver interface configured to sample or capture data bits $D_0$ through $D_7$ of FIG. 5.

A third example expands upon the bus data illustrated in FIG. 3, and is presented in FIG. 5. Again, the same data sequences shown in FIGS. 1 and 3 are repeated. Here, the total skew across the bus is greater than one UI. In this case, the parallel receiver interface of FIG. 2 could be re-architected to move 360° phase rotator ROT 120 into each RX LANE 130c as shown in FIG. 6. The conventional architecture of FIG. 6 now uses a total of eight phase rotators 120, as compared to only one in the architecture of FIG. 2. If phase rotator 120 (and any required clock conditioning circuitry associated with the phase rotator) consumes more power than the fractional-UI delay adjustment element in FIG. 4, then the architecture of FIG. 6 now represents the highest power parallel receiver interface of the three discussed thus far. However, the architecture of FIG. 6 is also the most flexible solution in that it could be used to sample the data sequences in FIG. 1, 3, or 5. Consequently, this architecture is most cost-effective from a development and qualification perspective since it can address the widest application space. However, for applications such as high-density links over a multi-chip module, the power utilized represents a severe drawback.

Figure 7:
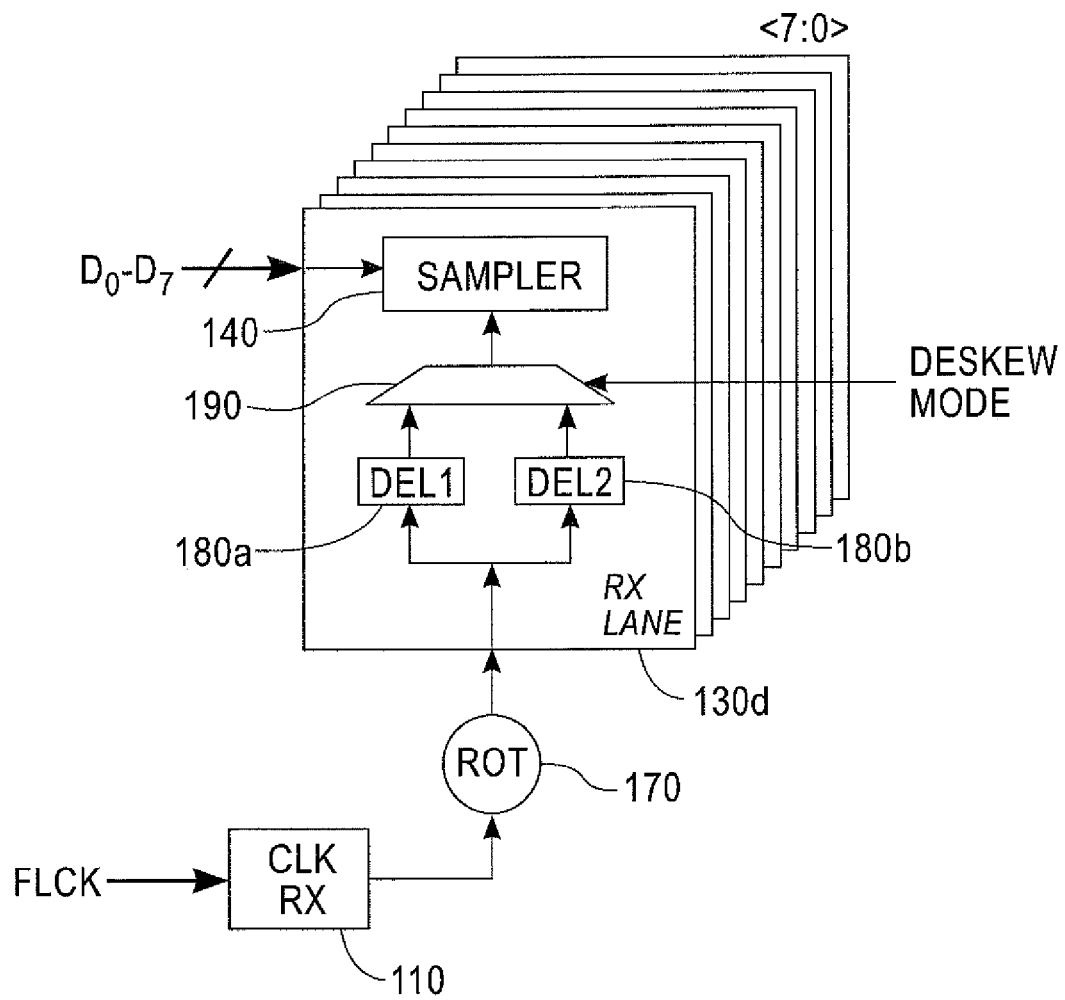
FIG. 7 depicts a parallel receiver interface with multiple skew compensation modes in accordance with a exemplary embodiment of the present disclosure.

To address these issues, FIG. 7 shows a parallel receiver interface with multiple skew compensation modes in accordance with a exemplary embodiment of the present disclosure. Although an 8-bit wide interface is depicted, the architecture is easily scalable to any arbitrary bus width as would be obvious to those skilled in the art. The forwarded clock is received and sent to global phase rotator ROT 170 that is used to set the global sampling clock phase. The output of the global phase rotator is distributed to each of the RX LANES 130d. Within each a single RX LANE 130d, the clock is sent to parallel delay elements (DEL1, DEL2) 180a, 180b. As would be apparent to those skilled in the art, buffers (not shown) can be inserted between global phase rotator 170 and DEL1 180a and DEL2 180b such that the inclusion of multiple delay elements does not present significant loading to the global clock distribution. DEL1 180a and DEL2 180b have different ranges of programmable delay, intended to handle different use scenarios where the lane-to-lane skew introduced by the physical transmission medium can be small or large. In a degenerate case, one of the delay elements could have zero delay range (i.e., its delay is not adjustable or programmed) if no skew compensation is required (e.g., capturing the data of FIG. 1). At the other extreme, one of the delay elements could be a full 360° phase rotator, which could be enabled for applications when considerable skew must be compensated (e.g., the data of FIG. 5). The associated clock conditioning circuits (e.g., quadrature phase generation) for the full phase rotator could be implemented within each RX LANE 130d, or could be implemented at a global level after the global phase rotator ROT 170. Either option, or perhaps others developed by those skilled in the art, would not violate the spirit of the present invention. Regardless, it is expected that the full phase rotator (with or without clock conditioning circuits) will consume more power than a delay element with no programmability. These two extremes illustrate the benefit of the present disclosure. The lower-power, non-programmable element can be selected for applications that require no skew compensation across the parallel interface (such as short interconnects on a silicon interposer MCM). In this scenario, a full phase rotator within each RX LANE 130d can be powered down, and no significant power penalty is paid by integrating the full phase rotator into the RX LANE 130d. For other applications such as longer chip-to-chip links over a PCB, the full phase rotator per lane can be selected and powered on to enable multiple UI deskew capabilities. This avoids the requirement of developing and fabricating two different serializers/deserializers (SERDES) for the two separate applications. The exemplary embodiments of the present disclosure allow for one RX LANE to handle both scenarios, with power-scalable skew compensation capabilities.

As another exemplary embodiment, note that one or both of the DEL1 180a and DEL2 180b could provide a fractional-UI deskew capability. This could be accomplished, for example, by implementing the delay element with programmable delay lines. This implementation represents a third alternative skew compensation circuit in addition to the two described above, and would be useful for scenarios such as longer interconnects on a silicon interposer MCM. It is expected that a fractional-UI deskew circuit would consume less power than the full rotator, and provide more functionality (possibly with higher power) than the non-programmable delay circuit in the previous illustration.

Still referring to FIG. 7, after DEL1 180a and DEL2 180b, multiplexer (MUX) 190 selects the appropriate delay path based upon logic signal DESKEW MODE. The value of this logic signal could be programmed by the user based upon the application in which the receiver is being used. Alternatively, a skew compensation algorithm could determine the appropriate deskew mode at startup. For example, at startup the received eye center position for each RX LANE 130*d* could be determined using ROT 170. Based upon the variations in the eye centers across the parallel interface, the appropriate skew compensation circuit could be determined. Note that logic signal DESKEW MODE (or another signal logically derived from logic signal DESKEW MODE) can also be used to power down the unused parallel delay elements in order to save power.

Figure 8:
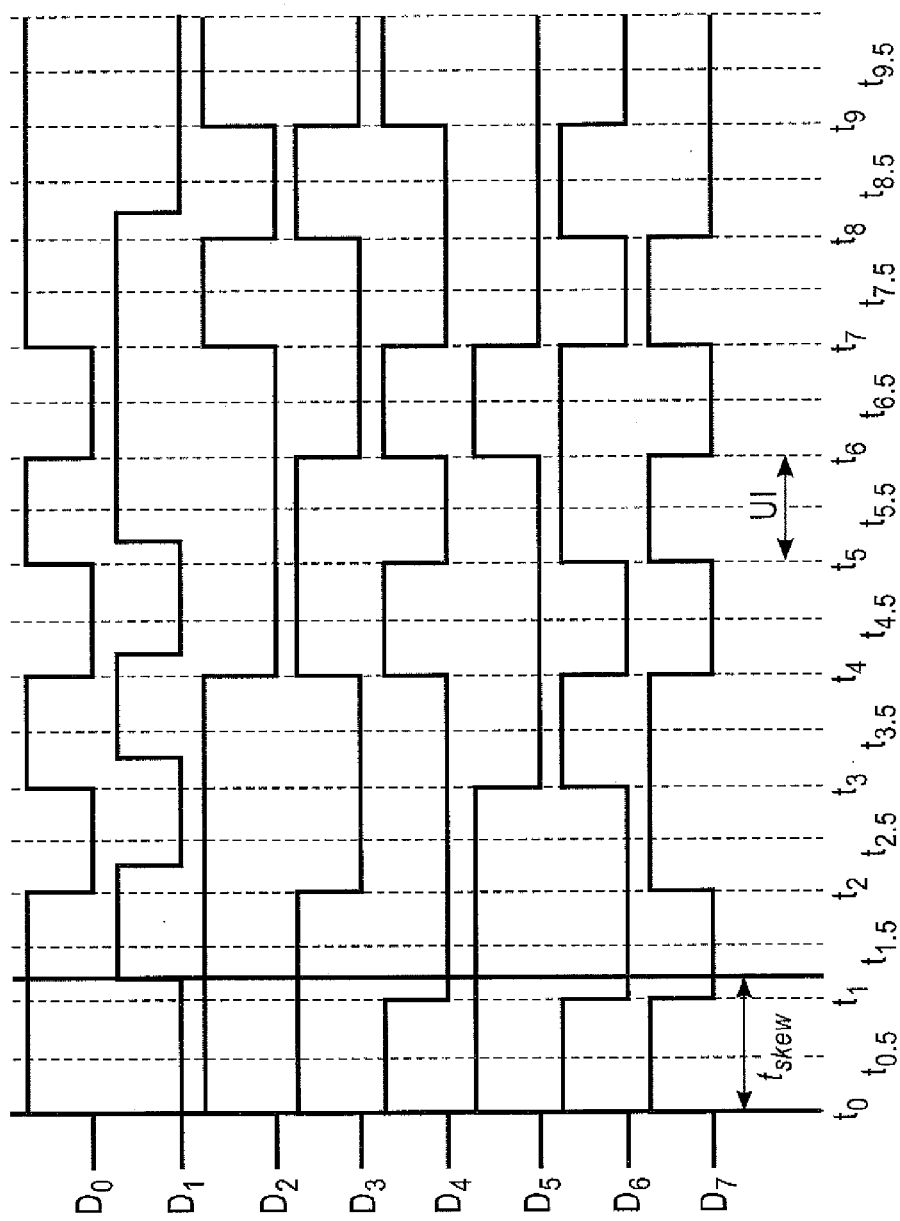
FIG. 8 depicts 8-bit wide parallel bus data with skew on only one data lane.

The architecture in FIG. 7 shows logic signal DESKEW MODE being applied to each RX LANE 130*d* in the parallel interface. Alternatively, there could be a logic signal DESKEW MODE for each RX LANE 130*d*, such that delay elements could be selected independently for each RX LANE 130*d*. This could accommodate scenarios like the one depicted in FIG. 8. Again, the same data sequences are shown as were illustrated in FIGS. 1, 3, and 5. In this scenario, seven data bits are aligned but one data bit ($D_1$) is skewed relative to the other seven. If DEL1 180*a* of FIG. 7 represents a non-programmable delay element, it would be selected for the RX LANES 130*d* capturing data bits $D_0$ and $D_2$, $D_3$, . . . $D_7$. Alternatively, if DEL2 180*b* represents a full 360° phase rotator, it would be enabled on the RX LANE 130*d* capturing the skewed bit $D_1$. As a result, the high-power skew-compensation circuits are only enabled on the lanes where they are needed, and lower power circuits can be enabled otherwise.

The architecture of FIG. 7 could be modified to include more than two parallel clock delay elements within each RX LANE 130*d*. For example, three parallel clock delay elements could be included to handle use scenarios for compensation of no skew, greater than 1 UI skew, and less than 1 UI skew. As described above, a deskew mode selection logic signal could be asserted for the entire parallel interface, or multiple deskew mode selection logic signals (one per bit receiver) could be implemented.

Figure 9:
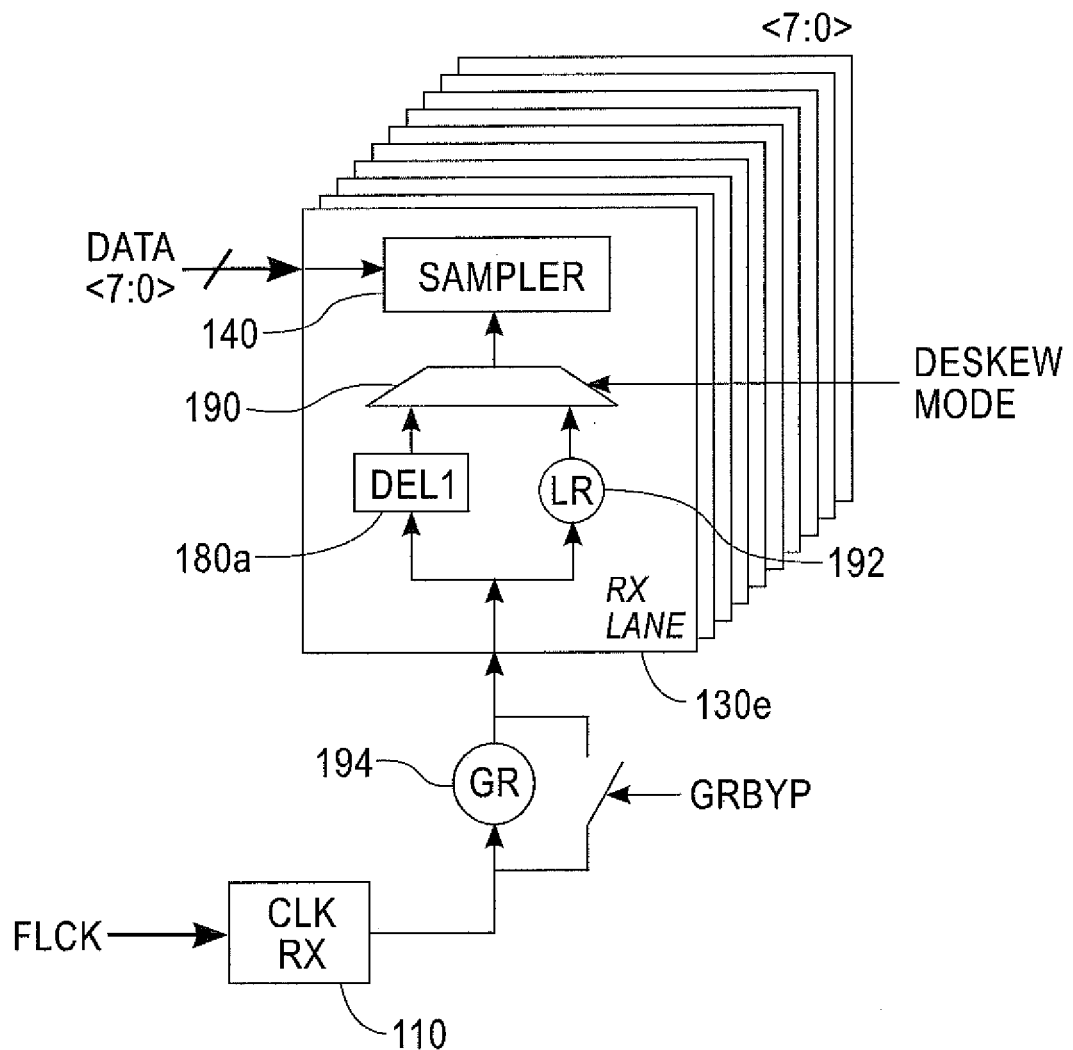
FIG. 9 depicts a parallel receiver interface where a global 360° phase adjustment circuit can be disabled and powered down when 360° degree phase circuitry is enabled within each of the parallel data receivers in accordance with a exemplary embodiment of the present disclosure.

A second exemplary embodiment of the present disclosure is depicted in FIG. 9, which shows a parallel receiver interface where a global 360° phase adjustment circuit can be disabled and powered down when 360° degree phase circuitry is enabled within each of the parallel data receivers in accordance with a exemplary embodiment of the present disclosure. In this embodiment, one delay element within each RX LANE 130*e* is replaced with per-lane 360° phase rotator (LR) 192 to provide at least one full unit interval of deskew compensation capability. If LR 192 is selected for skew compensation, global phase rotator (GR) 194 may not be needed and could be bypassed and powered down by asserting control signal GRBYP. It is noted that, depending on the architecture of the per-lane phase rotator, it may require a multi-phase clock input that is not required by the other delay elements. For example, 4-quadrant phase rotators require quadrature clock inputs. These additional clock phases may be generated locally (i.e., within the RX LANE 130*e*), or could be distributed globally by a clock distribution network that enables the distribution of the extra clock phases when the per-lane phase rotator deskew mode is enabled. Such an architectural decision can readily be made by those skilled in the art and does not alter the spirit of the present disclosure. As with the first embodiment presented in FIG. 7, it is understood that the number of per-lane parallel delay adjustment paths can be extended beyond the two shown in FIG. 9.

Figure 10:
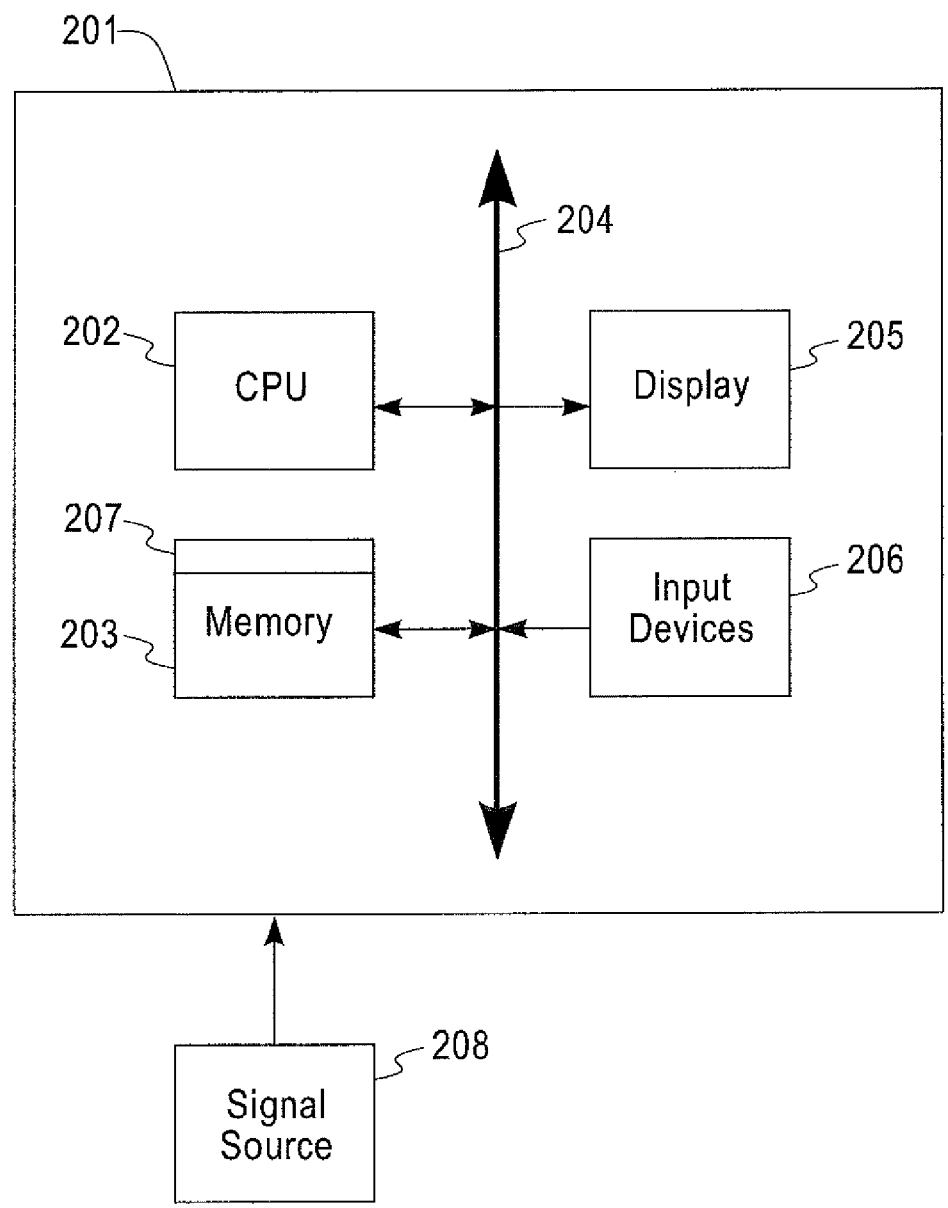
FIG. 10 depicts an exemplary computer system which can utilize the exemplary devices and methodology of the present disclosure.

The methodologies of the exemplary embodiments of the present disclosure may be particularly well suited for use in various electronic devices or systems. Accordingly, as depicted in FIG. 10, exemplary embodiments may take the form of an embodiment combining software and hardware aspects that may all generally be referred to as a "processor", "circuit," "module" or "system." Furthermore, exemplary implementations may in part take the form of computer program products for executing hardware functions and embodied in one or more computer readable medium(s) having computer readable program code stored thereon.

Any combination of one or more computer usable or computer readable medium(s) may be utilized. The computer-usable or computer-readable medium may be a computer readable storage medium. A computer readable storage medium may be, for example but not limited to, an electronic, magnetic, optical, electromagnetic, infrared, or semiconductor system, apparatus, device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an optical fibre, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus or device.

Computer program code for carrying out operations of the exemplary embodiments may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Exemplary embodiments are described herein with reference to signal arrows and/block diagrams. It will be understood that each block of the block diagrams, and combinations of blocks in the block diagrams, can be implemented by hardware accompanied by computer program instructions.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

For example, FIG. 10 is a block diagram depicting an exemplary computer system, which can utilize the devices and methodology described above. The computer system 201 may include a processor 202, memory 203 coupled to the processor (e.g., via a bus 204 or alternative connection means), as well as input/output (I/O) circuitry 205, 206 operative to interface with the processor 202. The processor 202 may be configured to perform one or more methodologies described in the present disclosure, illustrative embodiments of which are shown in the above figures and described herein.

Embodiments of the present disclosure can be implemented as a routine 207 that is stored in memory 203 and executed by the processor 202 to process the signal from the signal source 208. As such, the computer system 201 is a general-purpose computer system that becomes a specific purpose computer system when executing the routine 207 of the present disclosure.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to a multi-core processor that contains multiple processing cores in a processor or more than one processing device, and that various elements associated with a processing device may be shared by other processing devices.

It is to be appreciated that the term "processor" as used herein is intended to include any processing device, such as, for example, one that includes a central processing unit (CPU) and/or other processing circuitry (e.g., digital signal processor (DSP), microprocessor, etc.). Additionally, it is to be understood that the term "processor" may refer to more than one processing device, and that various elements associated with a processing device may be shared by other processing devices. The term "memory" as used herein is intended to include memory and other computer-readable media associated with a processor or CPU, such as, for example, random access memory (RAM), read only memory (ROM), fixed storage media (e.g., a hard drive), removable storage media (e.g., a diskette), flash memory, etc. Furthermore, the term "I/O circuitry" as used herein is intended to include, for example, one or more input devices (e.g., keyboard, mouse, etc.) for entering data to the processor, and/or one or more output devices (e.g., printer, monitor, etc.) for presenting the results associated with the processor.

The block diagrams in the figures illustrate the architecture, functionality, and operation of possible implementations of systems, methods and computer program products according to various embodiments. In this regard, each block in the block diagrams may represent a module, segment, or portion of code, which comprises one or more executable instructions for implementing the specified logical function(s). It should also be noted that, in some alternative implementations by those skilled in the art, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts, or combinations of special purpose hardware and computer instructions.

Although illustrative embodiments of the present disclosure have been described herein with reference to the accompanying drawings, it is to be understood that the present disclosure is not limited to those precise embodiments, and that various other changes and modifications may be made therein by those skilled in the art without departing from the scope of the appended claims.

What is claimed is:

1. A parallel, receiver interface comprising:
   a plurality of parallel data receivers, each parallel data receiver being configured to receive input data;
   a clock receiver configured to receive a forwarded clock;
   a phase interpolator, the input of which is coupled to the output of the dock receiver, and the output of which is coupled to each of the parallel receivers;
   multiple parallel clock delay elements within each of the parallel data receivers, the multiple parallel clock delay elements including a clock delay element having no phase adjustment capabilities, a clock delay element having phase adjustment capabilities for providing fractional unit interval deskew, and a clock delay element providing 360° phase adjustment capabilities; and
   a multiplexer circuit within each of the parallel data receivers, inputs of the multiplexer circuit being coupled to the outputs of each of the parallel clock delay elements within a respective parallel data receiver, and an output of the multiplexer circuit being coupled directly to a data sampler within the respective parallel data receiver, the multiplexer circuit being configured to be controlled by a logic signal.

2. The parallel receiver interface of claim 1, wherein a bypass path is provided for the phase interpolator.

3. The parallel receiver interface of claim 1, wherein parallel clock delay elements not selected by the multiplexer operate in a reduced power state.

4. The parallel receiver interface of claim 1, wherein one of the parallel clock delay elements within each parallel data receiver is programmable.

5. The parallel receiver interface of claim 1, wherein one of the parallel clock delay elements within each parallel data receiver is not programmable.

6. The parallel receiver interface of claim 1, wherein one of the parallel clock delay elements within each parallel data receiver is configured to provide 360° of clock phase adjustment.

7. The parallel receiver interface of claim 1, wherein multiple clock phases are provided to the clock receiver when selectively enabling at least one clock delay path.

8. A method for skew compensation for source-synchronous parallel interface receiver circuitry comprising:
   providing a plurality of independent parallel delay paths for each receiver, wherein each delay path has a different total delay range for clock skew compensation;
   providing each receiver with a sampler circuit for capturing data;
   providing a multiplexer in each receiver, the multiplexer responsive to the output of each of the independent parallel delay paths and directly coupled to the sampler circuit; and
   selectively enabling at least one desired delay path to delay a clock signal input to the source-synchronous parallel interface receiver circuitry and provide a desired clock skew compensation,
   wherein providing a plurality of independent delay paths comprises providing:
   a delay element having no phase adjustment capabilities;
   a delay element having phase adjustment capabilities for providing fractional unit interval deskew; and
   a delay element providing 360° phase adjustment capabilities.

9. The method of claim 8, further comprising bypassing and/or powering down at least one non-desired delay path to reduce power consumption.

10. The method of claim 9, wherein the bypassing and/or powering down is done by asserting a control signal.

11. The method of claim 8, wherein the selectively enabling is conducted based upon operating environment.

12. The method of claim 11, wherein the operating environment is a need for deskew.

13. The method of claim 11, wherein the operating environment is a need for phase adjustment.

14. The method of claim 8, further comprising providing multiple clock phases to the receiver when selectively enabling at least one clock delay path.

15. A source-synchronous parallel interface comprising:
a plurality of multiple parallel delay elements;
a sampler circuit for capturing data;
a multiplexer configured to receive the output of each of the multiple parallel delay elements, the multiplexer output being directly coupled to the sampler circuit; and
at least one controller for selectively enabling at least one of the delay elements to delay a clock signal input to the source-synchronous parallel interface such that clock skew is compensated,
wherein the multiple parallel delay elements comprise:
a delay element having no phase adjustment capabilities;
a delay element having phase adjustment capabilities for providing fractional unit interval deskew; and
a delay element providing 360° phase adjustment capabilities.

* * * * *